United States Patent
Honda

(10) Patent No.: US 6,775,157 B2
(45) Date of Patent: Aug. 10, 2004

(54) CLOSED LOOP ACTIVE EMI FILTER FOR REDUCING COMMON OR DIFFERENTIAL NOISE BASED ON AN ERROR VALUE

(75) Inventor: Jun Honda, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 10/602,162

(22) Filed: Jun. 24, 2003

(65) Prior Publication Data

US 2004/0008527 A1 Jan. 15, 2004

Related U.S. Application Data

(60) Provisional application No. 60/391,987, filed on Jun. 25, 2002, and provisional application No. 60/408,534, filed on Sep. 5, 2002.

(51) Int. Cl.[7] .............................. H02M 1/12; H02M 1/14
(52) U.S. Cl. ............................... 363/39; 363/40; 363/44
(58) Field of Search .............................. 363/39, 40, 44, 363/46, 47

(56) References Cited

U.S. PATENT DOCUMENTS

| | | | | |
|---|---|---|---|---|
| 4,710,861 A | * | 12/1987 | Kanner | 363/46 |
| 4,761,725 A | * | 8/1988 | Henze | 363/46 |
| 4,829,416 A | * | 5/1989 | Inaba et al. | 363/41 |
| 5,181,159 A | * | 1/1993 | Peterson et al. | 363/89 |

* cited by examiner

Primary Examiner—Bao Q. Vu
(74) Attorney, Agent, or Firm—Ostrolenk, Faber, Gerb & Soffen, LLP

(57) ABSTRACT

An active EMI filter senses current in a ground line or a power transmission line as a voltage cross a capacitor coupled to the line. The EMI filter senses common mode voltage and determines a difference between the common mode voltage and noise to provide an output to drive the difference to zero. The resulting active closed loop EMI filter produces good EMI dampening with greatly increased performance over a current transformer type EMI filter. A voltage regulator for the error amplifier improves noise reduction while increasing filter efficiency. The active EMI filter operates in a wide linear range that is greater than that of an equivalent current transformer circuit, while providing low cost and reliability.

18 Claims, 8 Drawing Sheets

CLOSED LOOP ACTIVE EMI FILTER FOR REDUCING COMMON OR DIFFERENTIAL NOISE BASED ON AN ERROR VALUE

RELATED APPLICATION

The present application is based on and claims benefit of U.S. Provisional Application No. 60/391,987 filed Jun. 25, 2002, entitled Active EMI Filter Having No Current Sensing Device, as well as U.S. Provisional Application No. 60/408, 534, filed Sep. 5, 2002, entitled Active EMI Filter, priority being hereby claimed to both the above-referenced applications.

BACKGROUND OF THE INVENTION

1. Field of the Invention

The present invention relates attenuation of electromagnetic interference (EMI) in a power transfer system, and relates in particular to EMI reduction in motor drive systems.

2. Description of Related Art

High-speed switching devices such as bipolar transistors, MOSFETs and IGBT's enable increased carrier frequency for voltage-source PWM inverters, thus leading to much better operating characteristics. High-speed switching, however, causes the following serious problems, originating from a high rate-of-change in voltage and/or current:

a) ground current escaping to earth through stray capacitors inside motors and through long cables;
b) conducted and radiated EMI;
c) motor bearing current and shaft voltage; and
d) shortening of insulation life of motors and transformers.

The voltage and/or current change caused by high-speed switching produces high-frequency oscillatory common-mode and normal-mode currents when the switching device (s) change state because parasitic stray capacitance inevitably exists inside a load, for example, an ac motor, as well as inside the switching converter. Thus, each time an inverter switching event occurs, the potential of the corresponding inverter output terminal moves, rapidly with respect to ground, and a pulse of common mode current flows in the d-c link to the inverter, via the capacitance of the heatsink motor cable and motor windings to ground. The amplitude of this pulse of current for a class B (residential) motor drive is typically several hundred millamps to several amps; and the pulse width is typically 250 to 500 ns. For a class A drive (Industrial), and depending on the size of the motor and length of the motor cable, the pulse current amplitude is typically several amperes with a pulse width of 250 ns to 500 ns, to 20 amperes or more with a pulse width of 1 to 2 micro seconds.

The common mode oscillatory currents may have a frequency spectrum range from the switching frequency of the converter to several tens of MHZ, which creates a magnetic field and will produce radiated electromagnetic interference (EMI) throughout, thus adversely affecting electronic devices such as radio receivers, medical equipment, etc.

A number of Governmental restrictions apply to the degree of permissible line current EMI and permissible ground current in certain motor applications. Thus, in Class B residential (appliances), applications, ground current must be kept below from 1 to 20 mA over a frequency range from 0 to 30 kHz respectively (over a logarithmic curve); and conducted line current EMI must be kept below designated values (less than about 60 dB$\mu$V) over a frequency range of 150 kHz to 300 MHZ. For motor drive applications designated as class A Industrial applications, limitations on ground current are less stringent, but line current EMI is still limited over the 150 kHz to 30 MHZ range.

Generally, common-mode chokes and EMI filters, based on passive elements, may not completely solve these problems. Passive filters, consisting of a common mode inductor and "Y" capacitors in the input ac line have been used to filter the common mode current in such motor drive circuits. Passive common mode filters may place limits on the PWM frequency which can be used, are physically large (frequently a major fraction of the volume of the motor drive structure) and are expensive., Further, they are functionally imperfect in that they exhibit undesired resonance which runs counter to the desired filtering action. Further, in general purpose industrial drives, the drive circuit and motor are often connected by cables which are up to 100 meters or more long. The longer the cable, the greater the conducted common mode EMI in the motor cable, and the larger the required size of a conventional passive common mode input filter.

A common-mode transformer with an additional winding shorted by a resistor is known which can damp the oscillatory ground current. Unfortunately, a small amount of aperiodic ground current will still remain in this circuit.

Active filters for control of the common mode current in a pulse width modulated (PWM) controlled motor drive circuit are well known. Such devices are typically described in the paper an Active Circuit for Cancellation of Common-Mode Voltage Generated by a PWM Inverter, by Satoshi Ogasawara et al., IEES Transactions on Power Electronics, Vol. 13, No. 5, (September 1998 and in U.S. Pat. No. 5,831,842 in the names of Ogasawara et al.

FIG. 10 shows a typical prior art active filter circuit or EMI and noise canceller for an a-c motor. Thus, in FIG. 10, an a-c source comprising an input terminal L and a neutral terminal are connected to the a-c input terminals of a full wave bridge connected rectifier 40. While a single phase supply is shown, the principles in this and in all Figures to be described can be carried out with a three-phase or multi-phase input. The positive and negative busses of rectifier 40 contain points A and D respectively and are connected to a three-phase bridge connected PWM controlled inverter 41, at inverter terminals B and F. The output a-c terminals of the inverter are connected to a-c motor 42. A filter capacitor 40a is also connected across terminals B and F. Motor 42 has a grounded housing connected to ground wire 43 with ground terminal 43a.

The active filter consists of a pair of transistors $Q_1$ and $Q_2$, connected across the d-c output lines of rectifier 40 with their emitters connected at node E. These define amplifiers which are controlled by output winding 44 of a differential transformer having input windings 45 and 46 connected in the positive and negative output busses of rectifier 40. The winding polarities are designated by the conventional dot symbols. Winding 44 is connected between the control terminals of transistors $Q_1$ and $Q_2$ and the common emitter node E. A d-c isolating capacitor 47 is connected to ground line 43 at node C.

The active filter including capacitor 47 defines a path for diverting the majority of the common mode current which can otherwise flow in the path L or N, A, B, M (motor 42), 43, 43a and back to L or N; (or in the reverse path when polarity reverses) or in path L or N, D, F, M, 43, 43a (or in the reverse path when polarity reverses). Thus, most common mode current can be diverted, for currents from positive terminal A, in the path B, M, C, E, $Q_2$, F, B, for "positive current", and in the pattern B, M, C, E, $Q_1$, B for "negative" current by the proper control of transistor $Q_1$ and $Q_2$. The path for common mode current flowing into negative terminal D follows the path F, M, C, E, $Q_2$, F for "positive" current and F, M, C, E, $Q_1$, B for "negative" current. The degree of diversion depends on the current gain of winding 44 and the current gain of $Q_2$, for "positive current", and the current gain of winding 44 and current gain of $Q_1$, for "negative" current. In order to obtain a sufficient degree of diversion of the common mode current, the overall current gain of winding 44 and transistors $Q_1$ and $Q_2$ must be high.

The sensing transformer 44, 45, 46 of FIG. 10 has been large and expensive in order to provide sufficiently high current gain. It would be very desirable to reduce the size and cost of this transformer without jeopardizing the operation of the circuit. A further problem is that because of the high gain required, this closed-loop circuit has a tendency to produce unwanted oscillation.

Further, it has been found that the transistors $Q_1$ and $Q_2$ may not be able to operate in their linear regions over a large enough range within the "headroom" defined by the circuit, thus defeating the active filtering action. The headroom, or the voltage between the collector and emitter of transistors $Q_1$ and $Q_2$ is best understood by considering the approximate equivalent circuit of FIG. 10, as shown in FIG. 11, in which the ground potential at C is the same as that of the neutral line in FIG. 10. Transistors $Q_1$ and $Q_2$ are shown as resistors $R_1$ and $R_2$ respectively with respective parallel connected diodes. The d-c bridge 40 is shown as two d-c sources 50 and 51, each producing an output voltage of $V_{DC}/2$ where $V_{DC}$ is the full output voltage between the positive and negative busses at terminals A and D, and an a-c source 52 having a peak a-c voltage of $V_{DC}/2$.

It can be seen from FIG. 2 that headroom can disappear at different portions of the cycle of source 52. Thus, consider a first situation in which the leakage impedances of transistors $Q_1$ and $Q_2$ are the same. In this case, the values of resistors $R_1$ and $R_2$ in FIG. 2 are about equal. Now, as the ground potential at terminal C swings between $(+)V_{DC}/2$ and $(-)V_{DC}/2$ with respect to the d-c midpoint at node 53 in FIG. 2, the potential at the emitters of transistors $Q_1$ and $Q_2$ also swings between $(+)V_{DC}/2$ and $(-) V_{DC}/2$, if it is assumed that the impedance of capacitor 47 is much smaller than $R_1$ and $R_2$. Therefore, during the periods when the potential at node E is close or equal to the potential of the d-c bus (at points B or F), insufficient voltage headroom exists for the relevant transistors $Q_1$ or $Q_2$ to operate as linear amplifiers, and the active filtering action is lost.

EMI filters are well known in a number of electromagnetic applications, particularly in power transfer systems. Systems involving power transfer typically include power inverters that can be used for power supply applications in addition to motor drives. Power inverters are typically supplied with electrical power through; power transmission lines that are operated in a multi-phase mode. For example, a three phase power supply is typical in applications involving inverter operation and motor drives. A three phase power supply includes three transmission lines with a voltage potential between the three pairs of power delivery lines. That is, if the three phase input is supplied through lines L1, L2 and L3, there is a voltage potential between lines L1 and L2, between lines L2 and L3, and between lines L1 and L3. These phase-to-phase voltages are typically sinusoidal and out of phase with respect to each other to provide efficient power transfer.

In a three phase system like that described above, the transmission lines act as differential voltage pairs in transmitting a power signal that is the value of the voltage between the various line pairs. This type of power transmission scheme is very useful in transmitting a power signal with immunity to noise interruptions that affect all the power lines at the same time. That is, if all of the power lines are impacted by a common interference or noise signal, all lines are affected to the same degree and the differential voltages remain the same. Accordingly, it is often the case that three phase transmission lines carry a common mode voltage that does not necessarily impact the power signals delivered to an inverter, for example.

When an inverter is used to power and control a motor drive system, the inverter typically uses high frequency switching to direct the appropriate power signals to the motor windings to produce the desired operation performance. For example, the inverter can be operated to control the motor for a specified torque operation, or a desired velocity. Due to the high frequency switching of the inverter, it is often the case that there are abrupt voltage transitions on the lines driving the motor, which are an inherent source of EMI. This EMI can produce common mode noise that causes interference in motor control signals, feedback signals I/O, sensors and the like. In addition, capacitive coupling with inverter outputs and ground, or the motor grounding by itself can produce high frequency ground currents that provide further interference with control signals and other communication signals. High frequency ground currents can also lead to radiated interference and produce groung loops that act as loop antennas to increase the production of radiated noise. The high frequency ground currents can also result in instantaneous voltage differences between two ground potential points, which interferes with appropriate references for control and communication signals.

A number of measures are available to reduce and control common mode noise and radiated EMI. For example, shielded power cables are used to connect the inverter to the motor to prevent noise current from flowing out of the motor drive system to ground. The power lines to the motor are also twisted to provide a balanced capacitive coupling to reduce the stray capacitive coupling to ground. A common mode choke is often used on the power lines in the motor to attenuate the common mode noise as well. An EMI filter is often attached to the input of the inverter to act as a low pass filter to remove common mode noise from the earth ground that might otherwise create a ground voltage differential for one or more components of the motor drive system.

Another technique to reduce EMI noise is to measure high frequency noise current and provide compensation for any detected currents. A current transformer has been used to sense noise current to determine appropriate compensation to control EMI. However, an appropriately sized and rated current transformer is bulky and expensive, and produces non-linear operation in practice. It would be desirable to provide a circuit and technique for reducing EMI without the use of a current transformer.

SUMMARY OF THE INVENTION

The present invention provides an active EMI filter that provides excellent EMI reduction characteristics without the use of a current transformer. The circuit and method according to the present invention senses voltage that is representative of current in a ground line and obtains a differential signal in comparison with common mode voltage on inverter input lines. The differential signal is amplified and used as an error signal in a closed loop control to reduce the difference between the common mode voltage and the sensed ground voltage to zero. Accordingly, the present invention determines high frequency ground current by measuring a voltage induced by the ground current and then compensating for the ground current. The circuit is operable for single or multi-phase power systems, while offering an improved efficiency over current transformer systems or linear voltage regulators that are conventionally used to reduce EMI.

In accordance with the present invention, there is provided a common mode voltage input to an error amplifier. A ground voltage input is supplied to the error amplifier as well to obtain an amplified error signal based on the two signals. The output of the error amplifier is supplied to the ground line to compensate the high frequency ground current to avoid propagation of the high frequency ground current in the motor drive system.

The error amplifier is operated in a range related to the upper and lower limits of the input power signals to automatically adjust operation of the error amplifier to the common mode voltage on the input power lines. A high open loop gain is obtained by operating a MOSFET as a controlled resistance to provide constant voltage output regardless of the noise amount cancelled. The controlled resistance reduces high frequency current transitions to further reduce EMI generated by the circuit.

BRIEF DESCRIPTION OF THE DRAWINGS

The present invention is described in greater detail below, with reference to the accompanying drawings, in which.

DETAILED DESCRIPTION OF THE PREFERRED EMBODIMENTS

Figure 1:
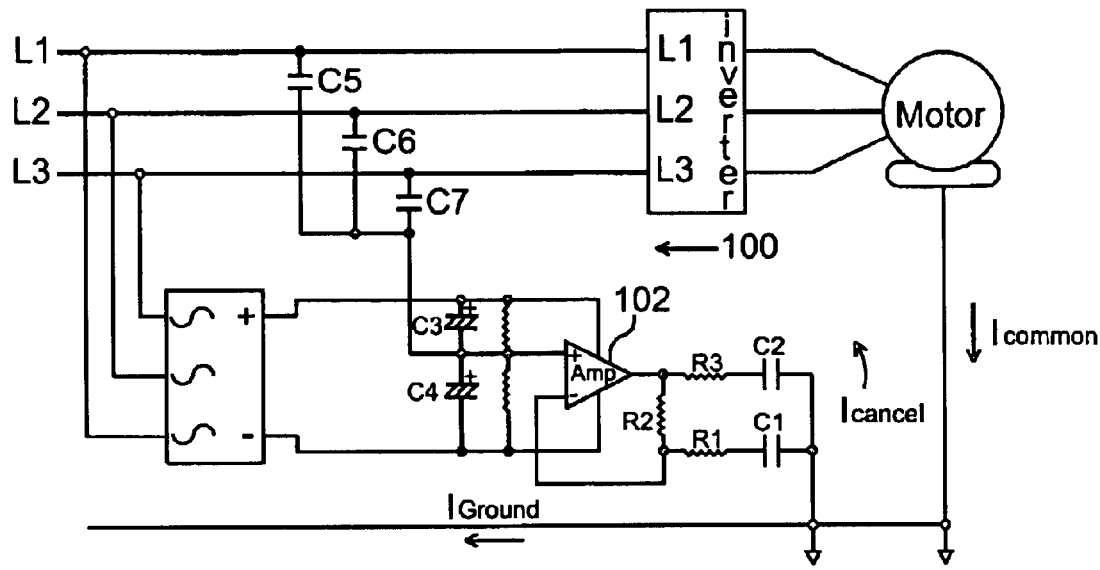
FIG. 1 is a circuit diagram illustrating the present invention.

Referring now to FIG. 1, an active EMI filter circuit 100 is illustrated. Common mode current from the motor casing is sensed through a voltage on R1 and C1, which is supplied to the inverting input of error amplifier 102. The gain of amplifier 102 is determined by the combination of R1 and C1 with R2.

The common mode voltage on power lines L1, L2 and L3 is sensed through capacitors C5–C7 and is provided to the non-inverting input of amplifier 102. If the common mode voltage sensed by capacitors C5–C7 is slightly positive with respect to the voltage measured for the ground reference through resistor R1 and capacitor C1, error amplifier 102 outputs and increased voltage to drive the difference between the two voltages to zero. One result of this situation is that the voltage rail of amplifier 102 decreases and the common mode voltage of the input line is decreased through capacitors C3–C7.

The operation of this circuit tends to provide a theoretical short between the non-inverting and inverting inputs of amplifier 102. Accordingly, the circuit avoids a common mode voltage between ground and the input lines.

Figure 2:
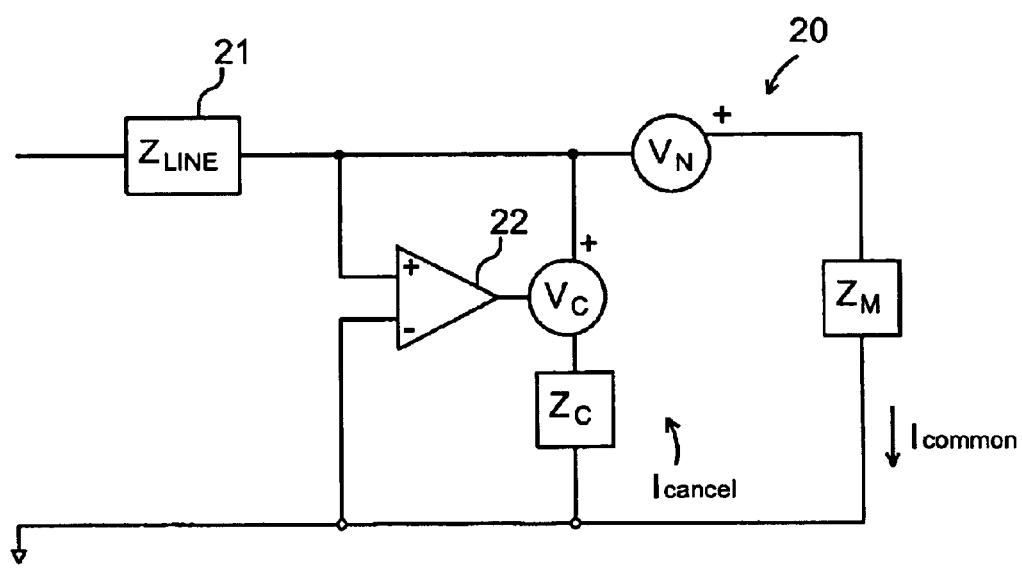
FIG. 2 is an abstract equivalent circuit of the circuit in FIG. 1.

Turning to FIG. 2, a common mode equivalent circuit is illustrated generally as circuit 20. The equivalent circuit 20 includes an input line impedance 21 and error amplifier 22. As discussed above, error amplifier 22 is operated to obtain a theoretical short between the inverting and non-inverting inputs. Voltage $V_N$ and impedance $Z_M$ represent the inverter in motor system driven by the input line. The common mode current is compensated with voltage source $V_C$ and impedance $Z_C$. Due to the imaginary short between the input terminals of amplifier 22, the sum of the currents at the node common to voltage $V_C$ and $V_N$ is described by the following equation.

$$\frac{V_N}{Z_M} + \frac{V_C}{Z_C} = 0 \quad (1)$$

As can be seen by equation (1), modulation of voltage $V_C$ permits equation (1) to be balanced, so that the currents cancel out. Accordingly, the common mode cancelling circuit prevents common mode current from propagating on the ground line.

Figure 3:
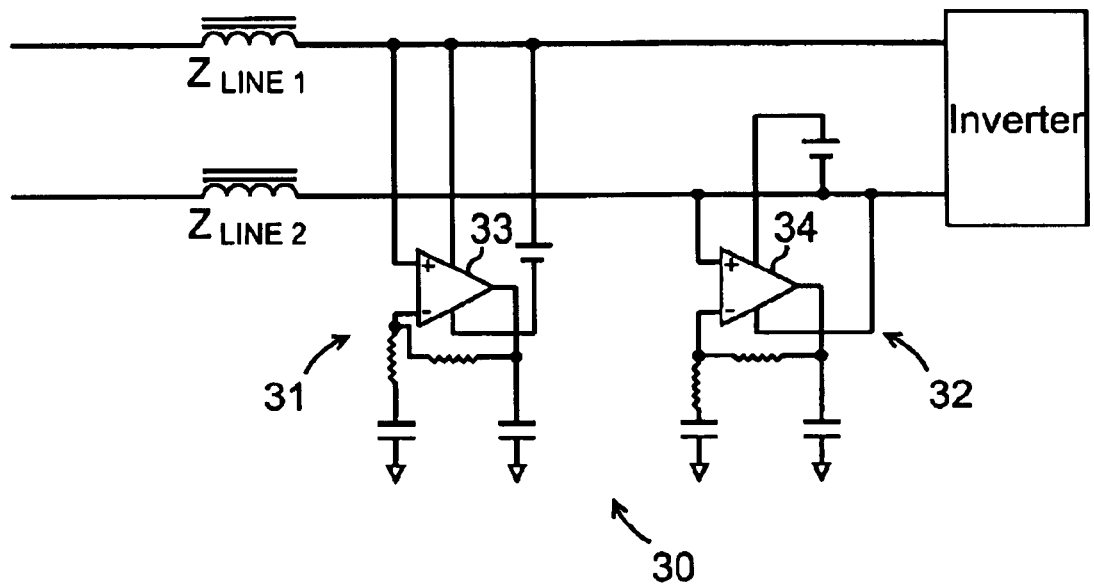
FIG. 3 is a circuit diagram illustrating the use of multiple active EMI filters according to the present invention.

Referring now to FIG. 3, a circuit 30 is illustrated for filtering common and differential mode noise with active EMI filters 31, 32. In operation, filters 31, 32 provide an imaginary or theoretical short on the power lines to which they are attached at the point of the non-inverting input of amplifiers 33, 34. Amplifiers 33, 34 sense the common mode voltage on the input lines and drive their respective outputs to produce a balanced voltage with respect to ground. This configuration and operation tends to cancel the common mode current routed to the input lines. In addition, because filters 31 and 32 are independently operated on each of the input lines, differences between the differential input lines are cancelled out, thereby filtering differential mode EMI noise.

Figure 4:
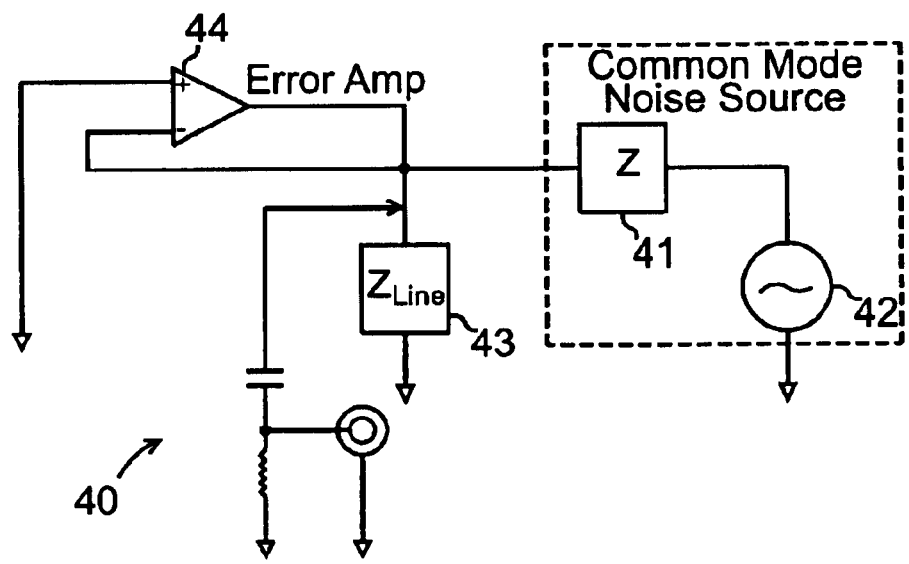
FIG. 4 is an abstract equivalent circuit of the present invention illustrating noise cancellation.

Referring now to FIG. 4, an equivalent circuit 40 is illustrated for the common and differential mode EMI filter of FIG. 3. A common mode noise source model is provided including impedance 41 and voltage source 42., The noise source injects common mode noise into the power line with impedance 43. Amplifier 44 detects any differential between ground potential and the input line and drives a signal into the input line to balance the common mode noise.

Figure 5:
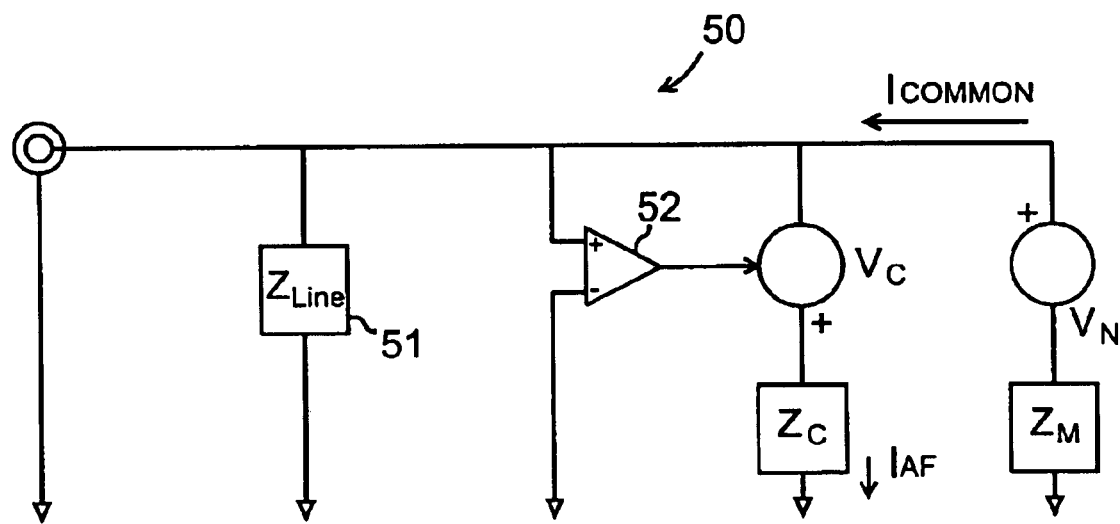
FIG. 5 is an abstract circuit diagram illustrating common mode noise cancellation in accordance with the present invention.

Referring now to FIG. 5, an active EMI filter 50 is modeled showing cancellation of common mode noise injected into the input line with line impedance 51. Amplifier 52 produces compensation voltage $V_C$ in conjunction with compensation impedance $Z_C$ to balance the common mode noise current supplied by voltage source $V_N$ in conjunction with impedance $Z_M$. Accordingly, active EMI filter circuit 50 prevents common mode current noise from being injected into the transmission line by providing a compensating current that matches that provided by the noise source.

Figure 6:
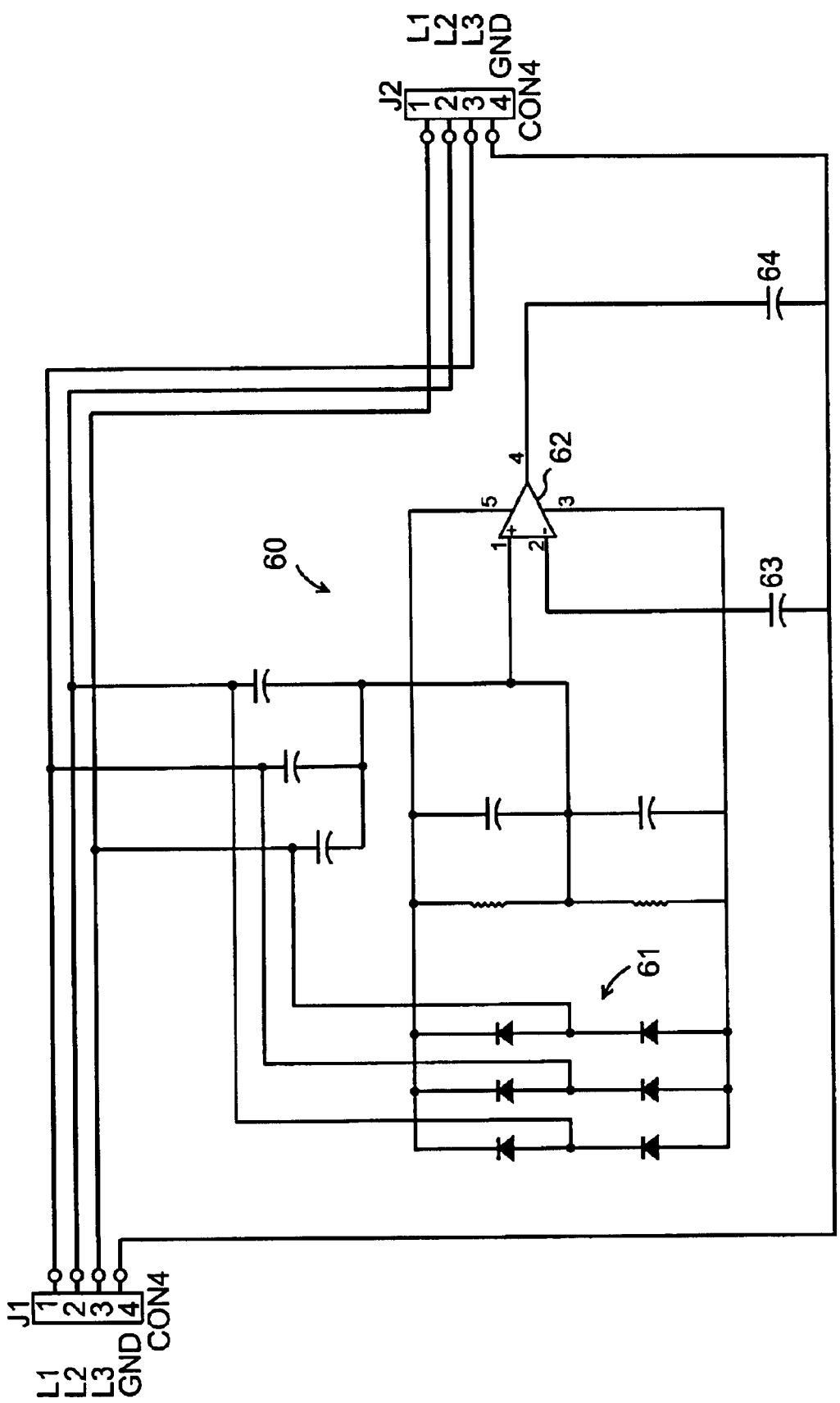
FIG. 6 is a circuit diagram illustrating a three phase common mode active EMI filter in accordance with the present invention.

Referring now to FIG. 6, a three phase common mode filter 60 is illustrated with a three phase rectifier 61. The output of rectifier 61 supplies the operating voltage rails to amplifier 62. Amplifier 62 has not feedback path, and operates only with capacitors 63,64 to provide a voltage signal to balance common mode voltage on input lines L1–L3. Accordingly, ground line current is sensed on capacitor 63 and compared against the reference provided by the common mode voltage from input lines L1–L3. An output voltage of amplifier 62 is obtained across capacitor 64, which tends to provide a balanced voltage to match the common mode voltage sensed on lines L1–L3.

Figure 7:
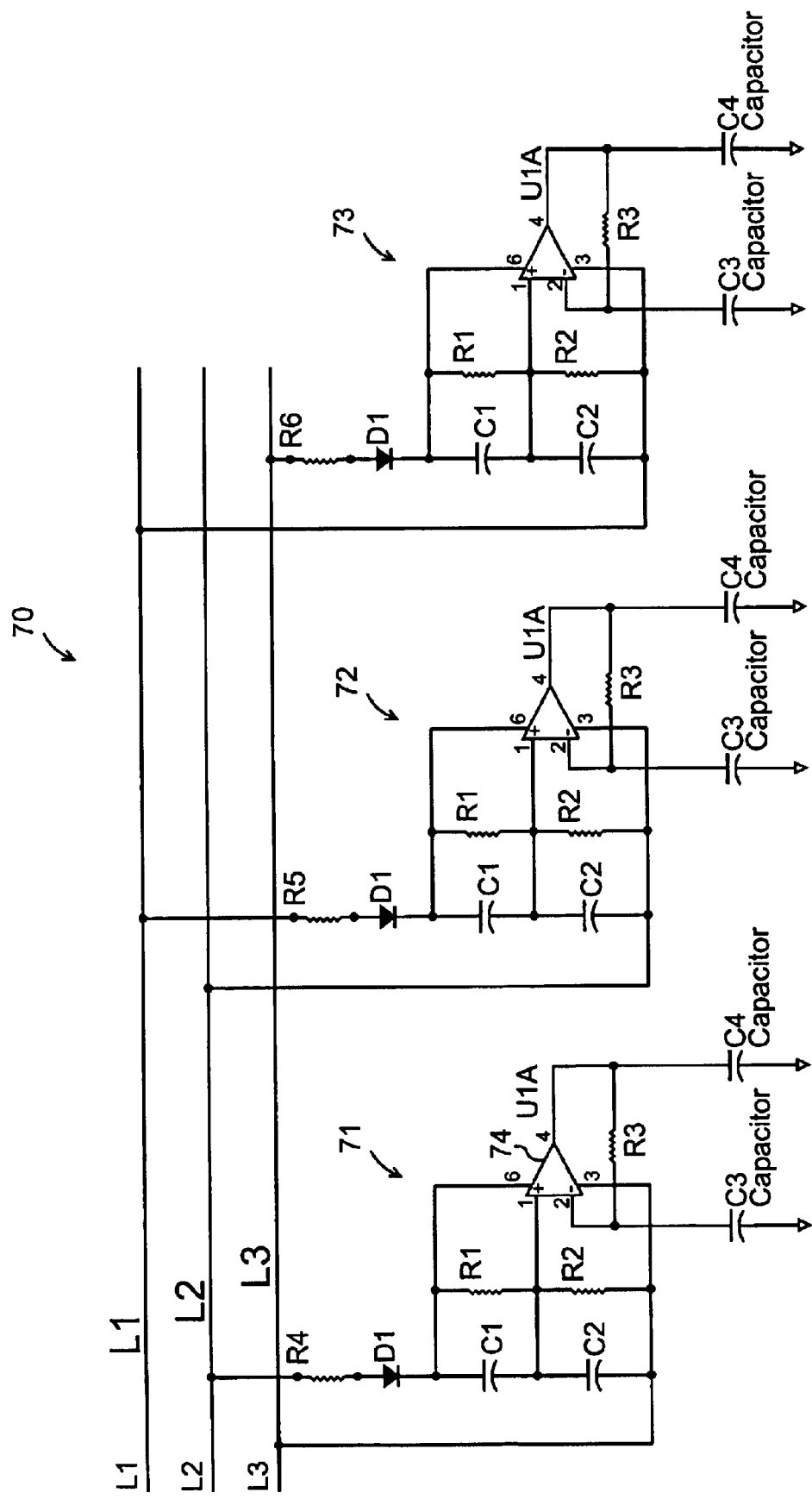
FIG. 7 is a circuit diagram illustrating common and differential mode active EMI filtering for a three phase input in accordance with the present invention.

Referring now to FIG. 7, a three phase common and differential mode filter 70 is illustrated. The configuration of filter 70 is a combination of the filters provided in FIGS. 3 and 6. For example, filter 71 provides common and differential mode filtering for input line L3, while filters 72 and 73 provide the same for input lines L2 and L1, respectively. A common mode voltage is supplied to the non-inverting input of amplifier 74 from input line L2, while input lines L2 and L3 supply the voltage rail power for amplifier 74. Capacitors C3 and C4 are used to develop voltages that are fed back to the inverting input of amplifier 74 to balance the voltage sensed from input line L2. By compensating the common mode voltage sensed on input line L2, filter 71 provides common mode filtering with respect to input line L3. Because each of EMI filters 71-73 are referenced to a ground potential with the same active configuration, differential mode noise between input lines L1–L3 is filtered, in addition to common mode noise for each of the input lines L1–L3.

Figure 8:
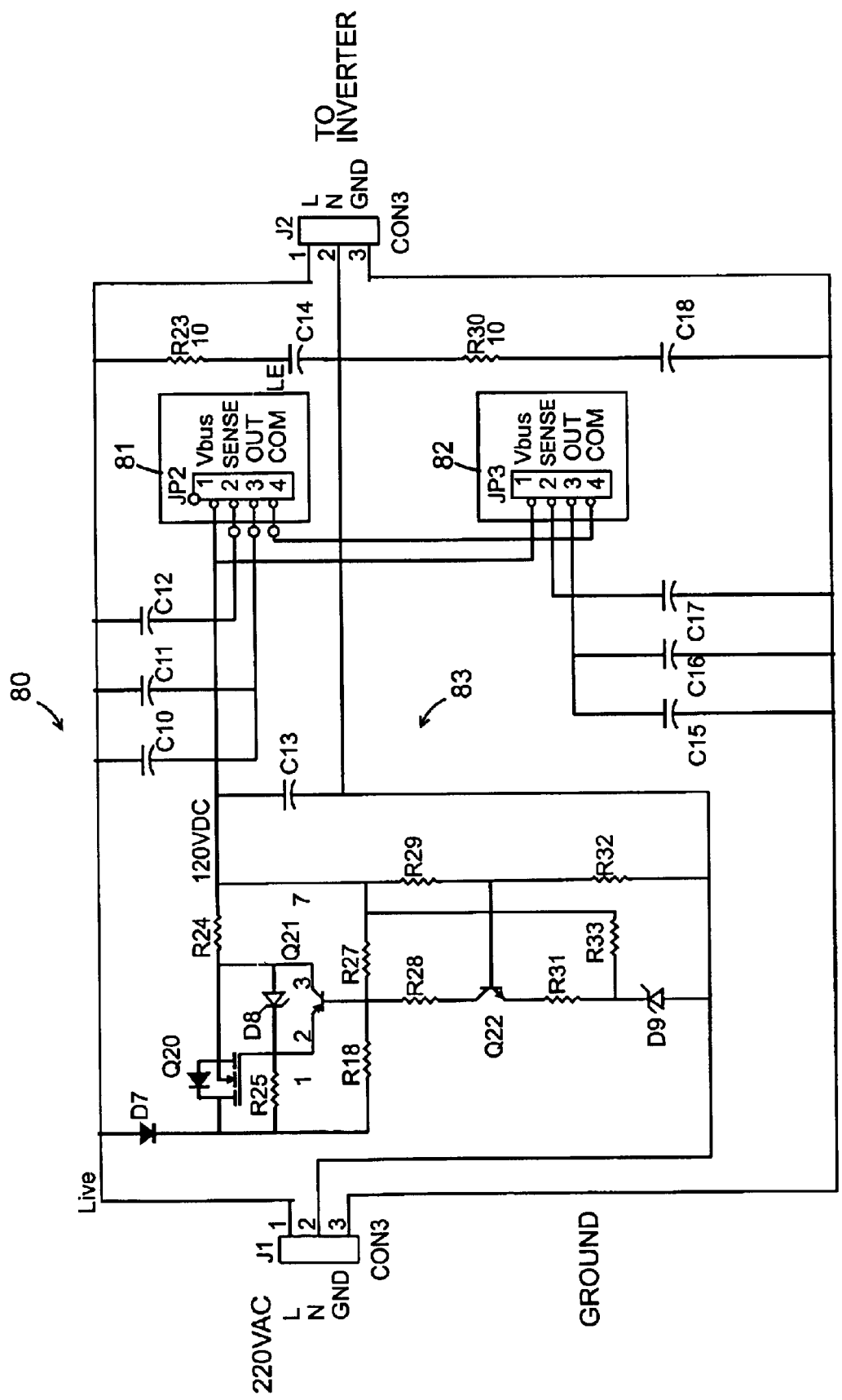
FIG. 8 is a circuit diagram illustrating a voltage drop regulator for an active EMI filter according to the present invention.

Referring now to FIG. 8, a voltage regulator circuit 80 for a common mode EMI filter according to the present invention is illustrated. Circuit 80 is similar to that illustrated in FIG. 3, with the exception that the rail voltage supplied to amplifiers 81, 82 is derived through a voltage regulator circuit 83, rather than directly from the input lines. EMI filters 31, 32 illustrated in FIG. 3 depend upon a high impedance power supply with respect to the impedance of the input line to obtain an appropriate maximum open loop gain. Accordingly, a MOSFET Q20 is operated as a constant resistance source to produce a regulated d-c power supply to error amplifiers 81, 82. A control transistor Q21 is driven to maintain a particular resistance for Q20. The result is a regulated voltage supplied to error amplifiers 81, 82. The circuit including zener diode D9 and transistor Q22 provide a constant voltage feedback, regardless of the noise amount cancelled. Accordingly, a certain amount of resistance is provided between the power supply obtained across capacitor C13, and the input line L, provided at the anode of a diode D7. Maintaining this resistance is important to perform the differential mode noise cancellation in the active EMI filter 80. Without the resistance maintained between the input line and the power supply to capacitor C13, the error amplifier loses its loop gain and obtains poor differential mode noise attenuation.

Circuit 80 also provides a feature to reduce differential mode noise generated by voltage regulator circuit 83. That is, charging current supplied to capacitor C13 has high di/dt spikes resulting from switching the voltage regulator and charging capacitor C13. A feedback look in the resistance control includes a resistive quantity to diminish the di/dt observed at diode D7.

Figure 9:
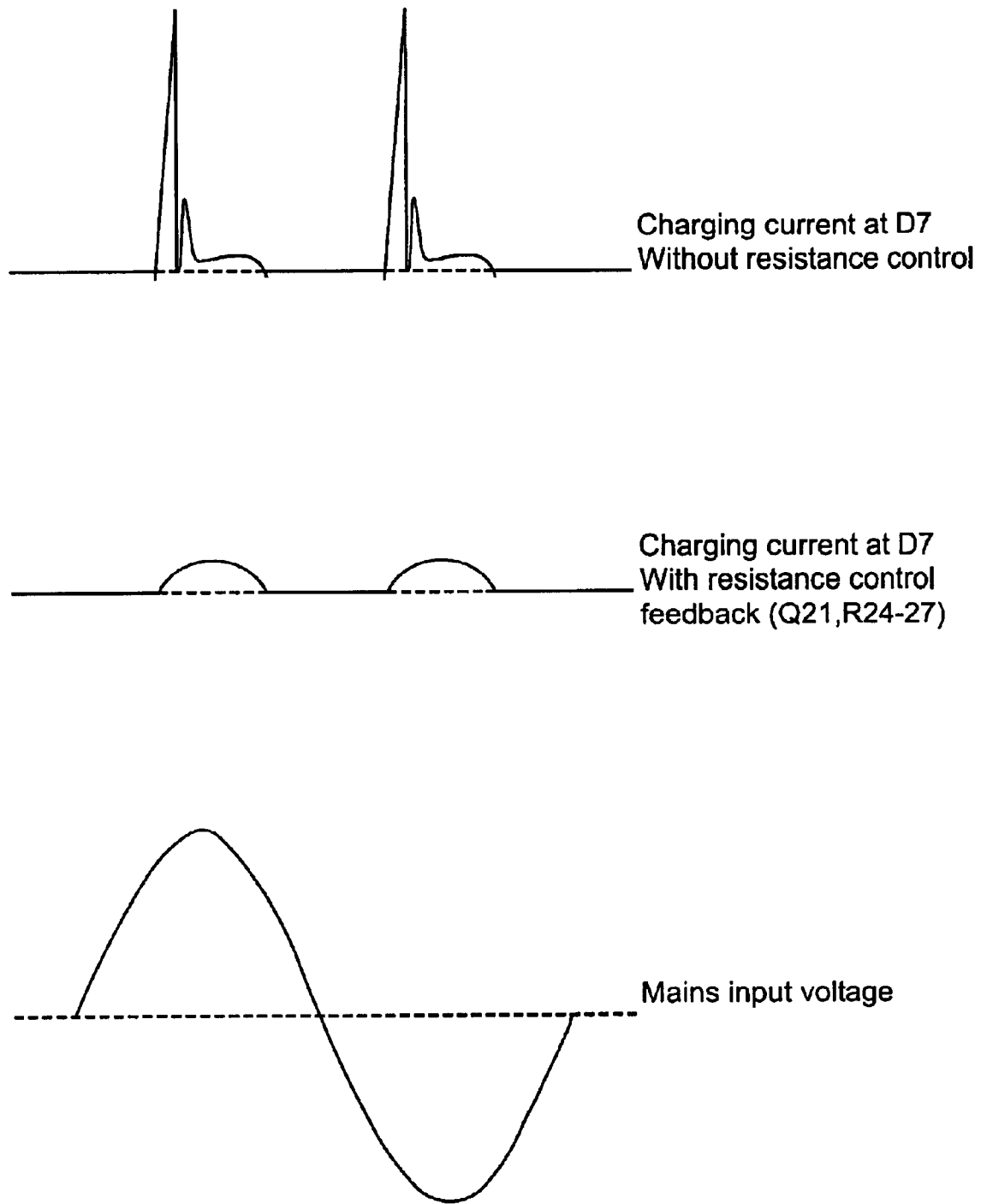
FIG. 9 is a graph illustrating a reduction in high frequency noise in a voltage regulator according to the present invention.
Figure 10:
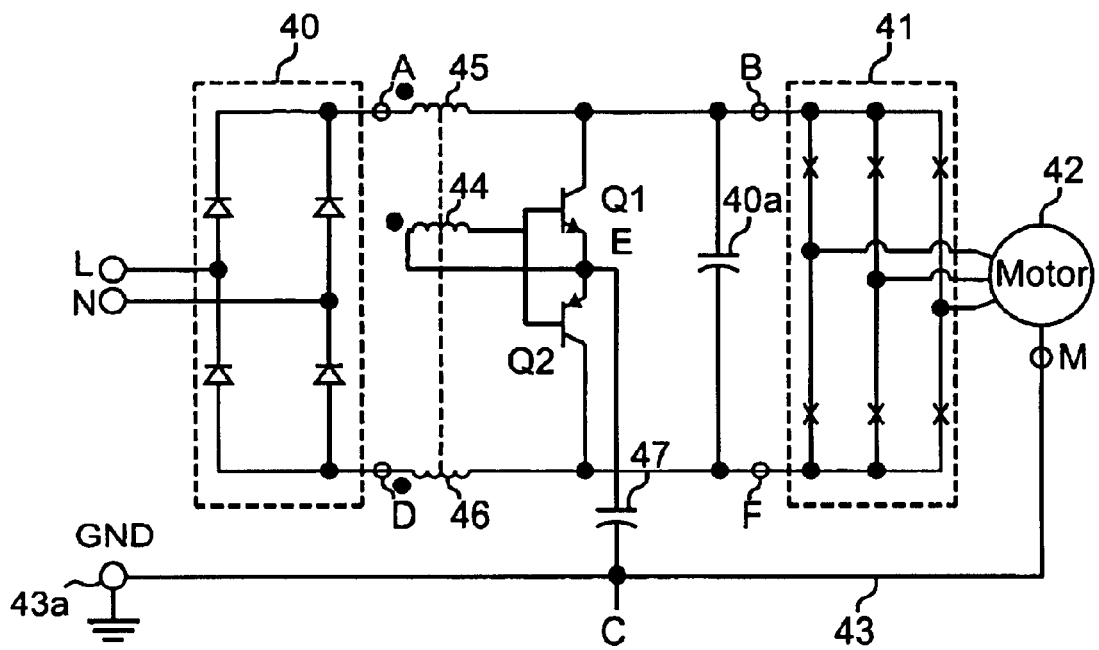
FIG. 10 is a circuit diagram of a known active EMI filter.
Figure 11:
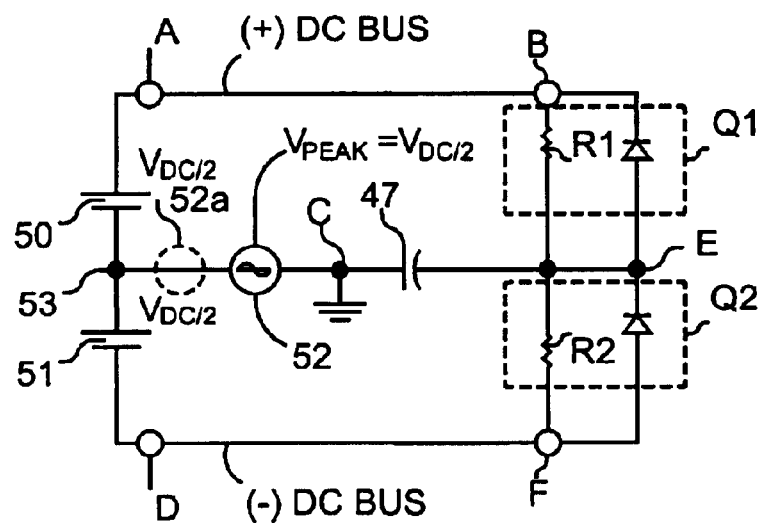
FIG. 11 is a circuit diagram of an equivalent circuit to that illustrated in FIG. 10.

FIG. 9 illustrates a current charging waveform observed at diode D7 in the absence of resistance control, and with resistance control feedback. Accordingly, transistor Q21 and resistors R24–R27 provide a closed loop resistance control and further diminishes current spikes to avoid introducing further differential mode noise in the active EMI filter of circuit 80.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A filter for an electrical power system, comprising:
   a plurality of voltage storage devices coupled to system lines to obtain voltages related to currents in the respective lines;
   an error amplifier coupled to the voltage storage devices and operable to output a signal based on a difference in voltage between the voltage storage devices;
   the output signal coupled to another voltage storage device to obtain a voltage with respect to the output signal; and
   wherein the voltage obtained from the output signal influences the difference in voltages between the voltage storage devices to decrease the difference.

2. The circuit according to claim 1, wherein the voltage storage devices are capacitors.

3. The circuit according to claim 1, wherein at least one system line is an input power line, and at least one other system line is a ground line.

4. The circuit according to claim 1, wherein the system lines are input power lines.

5. The circuit according to claim 1, further comprising:
   a power supply to the error amplifier for powering the error amplifier; and
   the power, supply being coupled to one or more input lines in the electrical power system.

6. The circuit according to claim 1, wherein the electrical power system is a single phase system.

7. The circuit according to claim 1, wherein the electrical power system is a three-phase system.

8. The circuit according to claim 5, wherein the power supply includes a rectifier.

9. The circuit according to claim 5, wherein the power supply includes a controlled resistance device.

10. The circuit according to claim 8, wherein the power supply further comprises a controlled resistance device.

11. The circuit according to claim 1, further comprising a regulated voltage source supplied to the error amplifier for powering the error amplifier.

12. The circuit according to claim 11, wherein the voltage regulator is coupled to one or more input lines in the electrical power system.

13. The circuit according to claim 11, wherein the voltage regulator includes a controlled resistance.

14. The circuit according to claim 13, wherein the controlled resistances coupled to a voltage control feedback loop to obtain a regulated voltage output.

15. A method for reducing EMI in an electrical power circuit with an active EMI filter, comprising:
   sensing a voltage on at least one of an input and ground line related to current through the line;
   sensing voltage in at least another of the input and ground line;
   comparing the sense to voltages and providing a voltage signal based on differences between the voltages; and applying the voltage signal to at least one of the input and ground lines to thereby reduce the voltage difference.

16. The method according to claim 15, further comprising amplifying the voltage difference to obtain a closed loop feedback control.

17. An active EMI filter, comprising:

an error amplifier for amplifying an error signal;

a capacitor coupled to an input of the error amplifier for developing a voltage related to a sensed current;

a second capacitor coupled to a second input of the error amplifier for developing a voltage related to a sensed current;

an output capacitor coupled to an output of the error amplifier and at least one of the first and second capacitors;

a voltage regulator coupled to a power supply input of the error amplifier; and wherein the error amplifier is operable to detect a difference in voltages developed across the first and second capacitors and supply a voltage to the output capacitor to compensate the difference in voltages between the first and second capacitors.

18. An EMI filter, comprising:

a variable voltage source being controllable based on a sensed electrical signal;

an impedance coupled to the variable voltage source;

a node having commode mode noise comprising a noise voltage and a device impedance, the node being common with the variable voltage source;

a controller for the variable voltage source, coupled to the variable voltage source and operable to produce a current in combination with the impedance to match a current obtained from the noise voltage source and device impedance at the node.

* * * * *